Dec. 16, 1930. J. T. WRIGHT Re. 17,905

METHOD OF LUBRICATING PERFORATOR PRESSES

Original Filed Aug. 17, 1927

INVENTOR

Joseph T. Wright

BY

Wood & Wood ATTORNEYS

Reissued Dec. 16, 1930 Re. 17,905

UNITED STATES PATENT OFFICE

JOSEPH T. WRIGHT, OF CINCINNATI, OHIO, ASSIGNOR TO THE J. T. WRIGHT COMPANY, OF CINCINNATI, OHIO, A CORPORATION OF OHIO

METHOD OF LUBRICATING PERFORATOR PRESSES

Original No. 1,734,024, dated October 29, 1929, Serial No. 213,665, filed August 17, 1927. Application for reissue filed October 29, 1930. Serial No. 492,004.

This invention relates to a method of lubricating a plurality of punch pins of a line perforating machine, whereby the shank portion of the pins in their reciprocating motions are constantly lubricated at a point above the perforating or cutting extremities thereof to lubricate its surface guidingly moving within apertures in a stripper bar and to a degree which will not result in a distribution of the lubricant to the cutter or die ends of the perforator pins which if permitted would be conveyed to and soil the paper perforated.

An object of the invention is to provide a lubricating pad in juxtaposition to a line or row of perforator punch pins to wipe the shank portions thereof and preferably disposing the pad longitudinally within a guide or stripper bar through which the perforator pins pass.

Further advantages and features of the invention will be more fully set forth in the description of the accompanying drawings illustrating further embodiments of the invention, in which.

Figure 1:
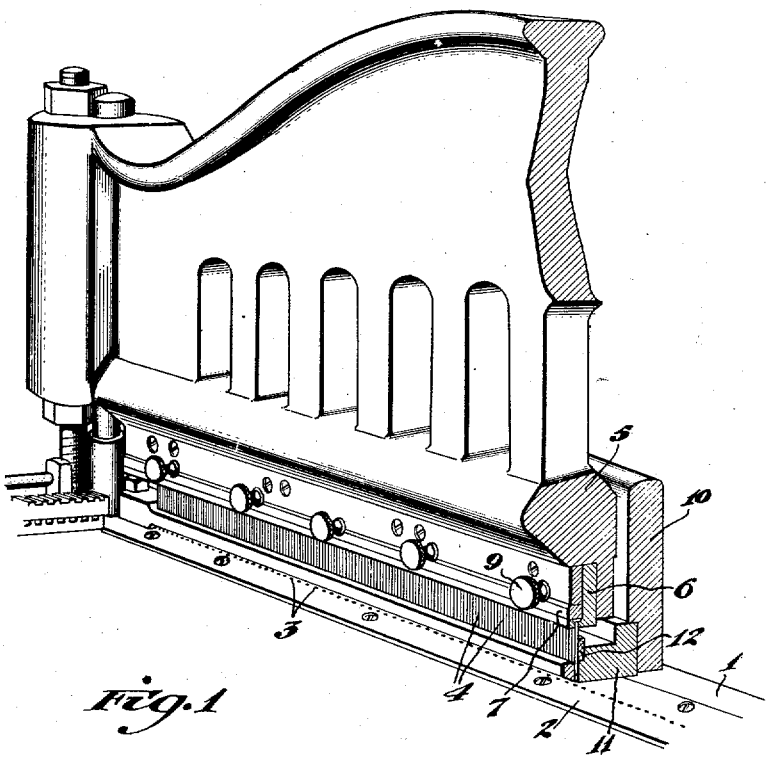
Figure 1 is a sectional perspective view of a perforator or punch carrying cross head and a top view of the work supporting table or a perforator press of conventional type with the improved method of lubricating the perforator pins incorporated.
Figure 2:
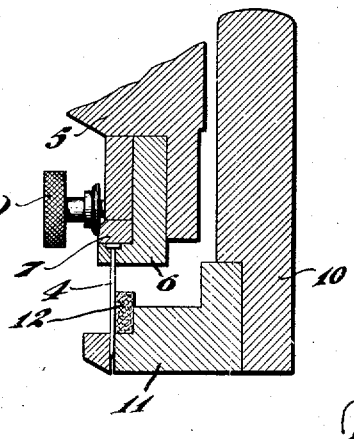
Figure 2 is an enlarged cross section through the horizontal stripper bar through which the perforator pins pass and are reciprocated.

Referring to the drawings, 1 indicates the table of a conventional type of perforator press carrying a die plate 2 which is removably recessed in the table and for line perforating is provided with a row of apertures or die holes 3 appropriately spaced for cooperation with the punch or perforator pins or needles 4 dependingly sustained from a reciprocating cross head 5. The cross head 5 is guidingly mounted at its opposite ends above the table and reciprocated in any well known manner, detailed illustration thereof not being made herein as it does not concern the present invention.

The punch or perforator pins each are headed and socketed within a retaining bar 6 preferably of angle form fixed to the cross head and held against longitudinal displacement by a clamping or backing bar 7 held in place by a series of thumb screws 9, the mounting of the needles or pins upon the cross heads following the prevailing methods.

A stationary cross or bridge bar 10 extends over and is spaced from the table in rear of the cross head providing a rigid support for a stripper bar 11 which extends forwardly between the cross head and table, its forward end being offset and apertured, the apertures guidingly receiving the perforator pins to maintain their alignment with the apertures of the die plate. The offset at the forward end of the stripper bar provides a ledge and shoulder in rear of the perforator pins serving as a pocket for holding a wick or lubricating pad 12 wiping contact with the rear side of the perforator pins immediately above the guide apertures on the stripper bar for administering the lubricant with the reciprocating action of the pins to the rear sides of the pins and to a degree which will not result in any of the lubricant being conveyed to the cutting or die extremities and carried to the paper to be perforated which would soil the paper. The pad engaging the rear or only a small portion of the circumference of each of the pins thus distributes a minute quantity of lubricant upon the pin surface so as to sufficiently lubricate the shank portions sliding within the apertures in the stripper bar relieving the pins of friction and wear in their reciprocating motion through the bar, as any perceptible wear of the pins or guide apertures destroys the alignment and registration of the pins with the apertures in the die plate, resulting in punching a ragged and oblong hole.

The pad projects slightly above the pocket or upper plane of the stripper bar 11, and within reach of the lower side of the cross head when at its limit of downward stroke, adapting the pad to be compressed with each downward stroke of the cross head and expand with the release of the compression. The pad is preferably of a felt material possessing the necessary resiliency to spring back to its original position as soon as the downward pressure of the cross head is released therefrom.

Compressing the pad on each downward stroke of the cross head, effects a more efficient application of the lubricant on the pins at a highest point thereof from which it is wiped or spread longitudinally of the pins by the pad when uncompressed avoiding a surplus delivery of lubricant. Continuously compressing and expanding the pad maintains its vitality and prevents the lubricant from solidifying along its pin wiping surface which if allowed to occur destroys the utility of the pad.

Having described my invention, I claim:

1. In a machine of the class described, a reciprocating cross head, one or more perforator pins dependingly sustained from said cross head, a stationary stripper bar beneath the cross head having apertures therethrough for guiding the perforator pins, and a lubricant distributing pad mounted on said stripper above the pin guiding apertures and wiping the shank portion of the pins for lubricating the pins in their reciprocating action at a point above the cutting ends of the pins.

2. In a machine of the class described, a reciprocating cross head, perforator pins dependingly sustained from said cross head, a stationary stripper bar beneath the cross head having apertures therethrough for guiding the perforator pins, and a lubricant distributing pad carried by said stripper bar in wiping contact with said perforator pins and exposed to the action of the cross head to be compressed thereby at the limit of its downward stroke.

In witness whereof, I hereunto subscribe my name.

JOSEPH T. WRIGHT.